(12) United States Patent
Jung et al.

(10) Patent No.: US 12,489,578 B2
(45) Date of Patent: Dec. 2, 2025

(54) METHOD AND APPARATUS FOR PERFORMING CONTENTION BASED RANDOM ACCESS IN A CARRIER FREQUENCY

(71) Applicant: Motorola Mobility LLC, Chicago, IL (US)

(72) Inventors: Hyejung Jung, Palatine, IL (US); Vijay Nangia, Woodridge, IL (US); Ravikiran Nory, Buffalo Grove, IL (US); Ravi Kuchibhotla, Gurnee, IL (US); Robert T Love, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 181 days.

(21) Appl. No.: 16/950,897

(22) Filed: Nov. 17, 2020

(65) Prior Publication Data

US 2021/0075574 A1 Mar. 11, 2021

Related U.S. Application Data

(63) Continuation of application No. 15/872,394, filed on Jan. 16, 2018, now Pat. No. 10,848,287.
(Continued)

(51) Int. Cl.
*H04L 5/00* (2006.01)
*H04W 72/21* (2023.01)
(Continued)

(52) U.S. Cl.
CPC .......... *H04L 5/0051* (2013.01); *H04L 5/0007* (2013.01); *H04W 74/0833* (2013.01);
(Continued)

(58) Field of Classification Search
CPC ............... H04L 5/0051; H04L 5/0007; H04W 72/1284; H04W 72/085; H04W 74/0833
See application file for complete search history.

(56) References Cited

U.S. PATENT DOCUMENTS

| | | | |
|---|---|---|---|
| 2009/0041240 A1* | 2/2009 | Parkvall ................ | H04W 72/02 380/247 |
| 2012/0106460 A1* | 5/2012 | Yang ...................... | H04L 5/001 370/328 |

(Continued)

FOREIGN PATENT DOCUMENTS

| | | | | |
|---|---|---|---|---|
| WO | WO-2013127453 A1 * | 9/2013 | ........... | H04L 5/0053 |
| WO | 2015137632 A1 | 9/2015 | | |

OTHER PUBLICATIONS

Heinrich, Dietmar, European Search Report, European Application No. EP 21 18 1834, European Patent Office, The Hauge, Munich, Germany, Oct. 6, 2021.

(Continued)

*Primary Examiner* — Kenny S Lin
*Assistant Examiner* — Rodrick Mak
(74) *Attorney, Agent, or Firm* — FIG. 1 Patents

(57) ABSTRACT

A method and user equipment are provided, in which an indication that a cell in a carrier frequency supports a 2-step random access procedure is received. A physical random access channel preamble is transmitted on a first time-frequency resource. A physical uplink channel carrying data is transmitted, where the physical uplink channel carrying the data is associated with the transmitted physical random access channel preamble. In response to the transmitted physical random access channel preamble and the transmitted physical uplink channel carrying the data, a user equipment specific channel is received within a random access response window The data includes a user equipment identity.

20 Claims, 8 Drawing Sheets

Related U.S. Application Data

(60) Provisional application No. 62/446,355, filed on Jan. 13, 2017.

(51) Int. Cl.
*H04W 72/542* (2023.01)
*H04W 74/0833* (2024.01)
*H04W 74/0836* (2024.01)
*H04W 74/0838* (2024.01)

(52) U.S. Cl.
CPC ........ *H04W 74/0836* (2024.01); *H04W 72/21* (2023.01); *H04W 72/542* (2023.01); *H04W 74/0838* (2024.01)

(56) References Cited

U.S. PATENT DOCUMENTS

| | | | | |
|---|---|---|---|---|
| 2016/0128022 | A1* | 5/2016 | Park | H04W 72/005 370/312 |
| 2017/0019930 | A1* | 1/2017 | Lee | H04W 72/21 |
| 2017/0353976 | A1* | 12/2017 | Yerramalli | H04W 72/0446 |
| 2018/0070377 | A1* | 3/2018 | Yu | H04L 5/0053 |
| 2018/0110074 | A1* | 4/2018 | Akkarakaran | H04W 74/0833 |
| 2018/0110075 | A1* | 4/2018 | Ly | H04W 74/0833 |
| 2018/0167901 | A1* | 6/2018 | Wang | H04W 74/006 |
| 2018/0270803 | A1* | 9/2018 | Kwak | H04W 56/00 |
| 2019/0327770 | A1* | 10/2019 | Liu | H04W 36/305 |
| 2021/0045160 | A1* | 2/2021 | Irukulapati | H04W 74/006 |
| 2021/0360702 | A1* | 11/2021 | Jang | H04W 36/0011 |

OTHER PUBLICATIONS

Interdigital Communications: "2-step random access procedure", 3GPP Draft; R1-1700703, 3rd Generation Partnership Project (3GPP), Mobile Competence Centre; 650, Route Des Lucioles; F-06921 Sophia-Antipolis Cedex; France vol. RAN WG1 AH_NR Meeting, Spokane, USA; Jan. 16-20, 2017.

CATT: "Consideration on 2-step RA", 3GPP Draft; R2-1700205 2-step RA, 3rd Generation Partnership Project (3GPP), Mobile Competence Centre; 650, Route Des Lucioles; F-06921 Sophia-Antipolis Cedex; France vol. RAN WG2 Meeting Ad Hoc, Spokane, USA; Jan. 17-19, 2017.

CATT: "Further considerations on a 2-step RA Procedure", 3GPP Draft; R1-1700186, 3rd Generation Partnership Project (3GPP), Mobilecompetence Centre; 650, Route Des Lucioles ; F-06921 Sophia-Antipolis Cedex; France vol. RAN WG1 AH_NR Meeting, Spokane, USA; Jan. 16-20, 2017.

Zte et al: "2-step Random Access Procedure", 3GPP Draft; R1-1700105, 3rd Generation Partnership Project (3GPP), Mobile Competence Centre; 650, Route Des Lucioles; F-06921 Sophia-Antipolis Cedex; France vol. RAN WG1 AH_NR Meeting, Spokane, USA; Jan. 16-20, 2017.

* cited by examiner

METHOD AND APPARATUS FOR PERFORMING CONTENTION BASED RANDOM ACCESS IN A CARRIER FREQUENCY

FIELD OF THE INVENTION

The present disclosure is directed to a method and apparatus for performing contention based random access in a carrier frequency of a communication network, and more particularly, to contention based random access having a reduced number of steps in support of lower latency communication.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

While operating within a network, the standard will define the manner in which the user equipment communicates with the network including initiating a new connection or refreshing an existing connection that has somehow become stale, such as for example where synchronization between the user equipment and the network access point has been lost. At least some developing and/or existing standards use a random access procedure in support of establishing a new or refreshing an already existing connection. A contention based random access can facilitate the possibility that multiple communication devices may be interested in attempting to access the network through the random access process at the same or similar point in time. Once access has been established and/or confirmed, the network can assign network resources to a particular user equipment in support of the uplink communication with the network.

However, a random access process, as a precursor to network resources being made available by the network to the user equipment represents signaling overhead in support of an uplink communication, which can also impact the latency associated with any particular communication. Often times, the process is supported by a four step interaction, which may better accommodate assumed worst case conditions. The present inventors have recognized that in some instances a two step process may be sufficient. As such, the present inventors have further recognized that simultaneously supporting both a two step and a four step process may be beneficial, whereby the circumstances and conditions alternatively associated with the selective beneficial application of a two step and a four step process might be identified and correspondingly encoded as part of the process. Such a process can improve communication latency where possible, and also continue to provide a more robust process where helpful, depending upon the determined present circumstances associated with the particular communication being requested.

SUMMARY

Presently, user equipment, such as wireless communication devices, communicate with other communication devices using wireless signals. According to a possible embodiment, a method in a user equipment is provided. The method includes receiving an indication that a cell in a carrier frequency supports a 2-step random access procedure. A physical random access channel preamble is transmitted on a first time-frequency resource. A physical uplink channel carrying data is transmitted, where the physical uplink channel carrying the data is associated with the transmitted physical random access channel preamble. In response to the transmitted physical random access channel preamble and the transmitted physical uplink channel carrying the data, a user equipment specific channel is received within a random access response window. The data includes a user equipment identity.

According to another possible embodiment, a user equipment is provided. The user equipment includes a controller. The user equipment further includes a transceiver, that receives an indication that a cell in a carrier frequency supports a 2-step random access procedure, and transmits a physical random access channel preamble on a first time-frequency resource. A physical uplink channel carrying data is transmitted by the transceiver, where the physical uplink channel carrying the data is associated with the transmitted physical random access channel preamble. In response to the transmitted physical random access channel preamble and the transmitted physical uplink channel carrying the data, a user equipment specific channel is received within a random access response window. The data includes a user equipment identity.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
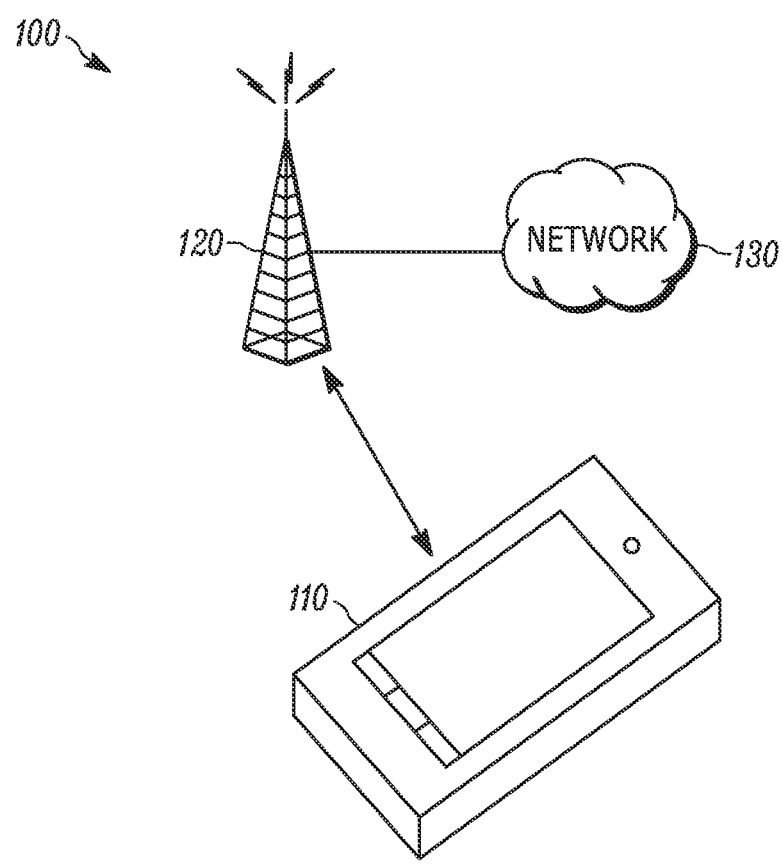
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for performing contention based random access in a carrier frequency.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

Figure 2:
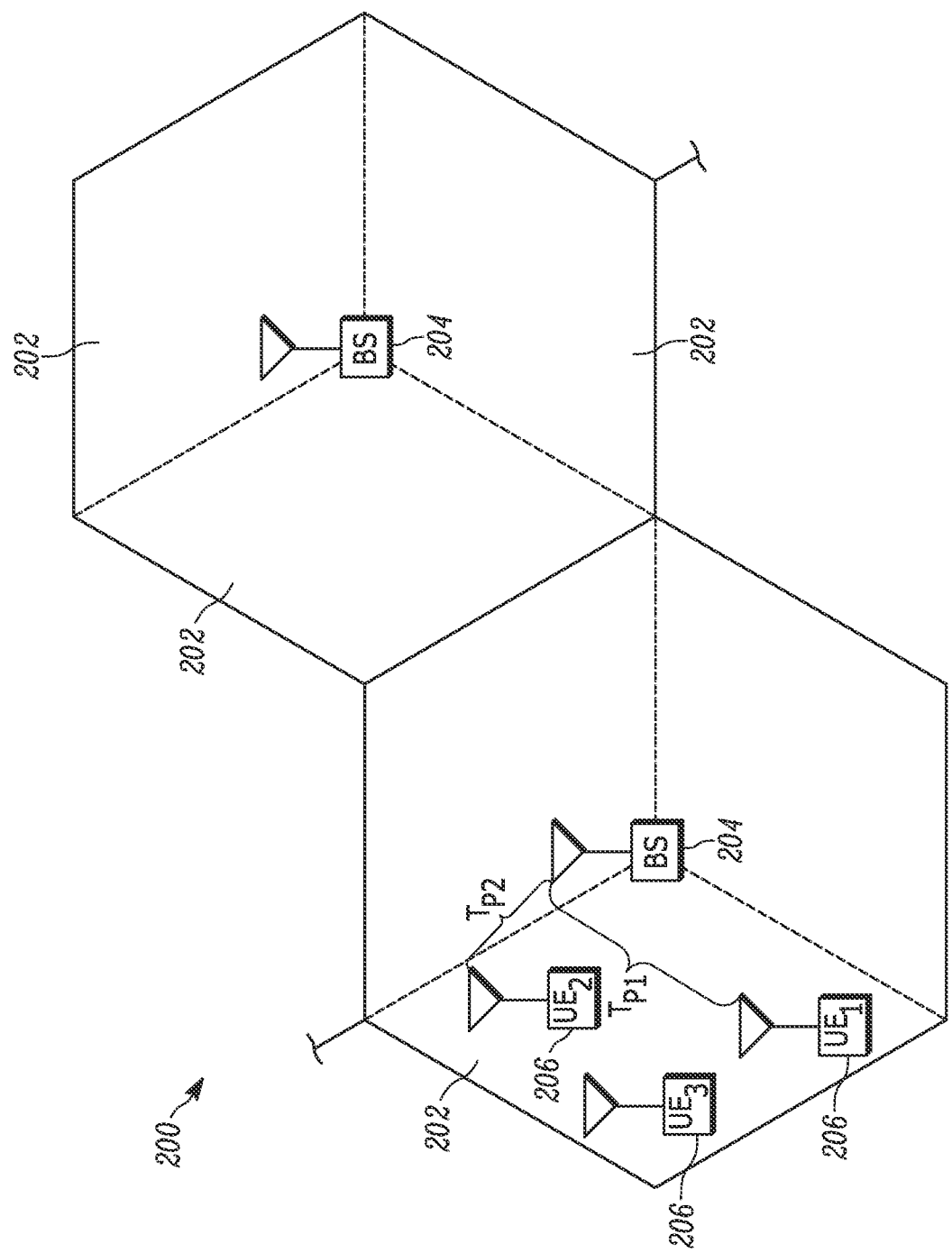
FIG. 2 is an overview of multiple communication regions in an exemplary cellular communication system.

In at least some instances, the network will provide coverage across a geographical area, where in at least some instances, the area of coverage will be divided into multiple regions, at least sometimes referred to as cells. FIG. 2 is an overview of multiple communication regions 202 in an exemplary cellular communication system 200. In many cellular communication networks, each of the multiple communication regions is often associated with a particular base station 204, which are intended to communicate with compatible user equipment 206 located within the associated communication region 202 and serve as an access point to the communication network. In some cases, more than one base station can support a particular communication area, such as in edge areas where regions may overlap. In some cases, a particular base station can support one or more communication regions. In the illustrated embodiment, each particular base station 204 can support at least three regions 202, where the base station is positioned at a shared vertex of each of the three regions.

The user equipment 206 will generally communicate wirelessly with the base station 204 using radio frequency signaling. Depending upon the location within the communication region 202, radio frequency signaling received between the base station 204 and the user equipment 206 will experience varying degrees of delay and attenuation, which needs to be managed as part of the user equipment's attempt to communicate with a base station 204. The degree of delay and attenuation will generally be dependent upon the distance between the user equipment and the base station, where closer user equipment relative to the base station will generally experience less delay and attenuation, and farther away user equipment will generally experience more. Other factors, such as the presence and the nature of any obstructions in the communication path between the user equipment and the base station can also have an effect on the degree of delay and attenuation. For example, wireless signaling between user equipment 1 and the base station might have an associated first propagation delay Tp1, and user equipment 2 and the base station might have an associated second propagation delay Tp2. Correspondingly, the relative propagation delay between all user equipment intending to communicate with a particular base station will have an associated delay spread, which corresponds to the difference between the various amounts of delay currently being experienced relative to the associated wireless signaling transmissions.

In LTE, a random access channel (RACH) is used for uplink synchronization or scheduling request. User equipment's (UE's) contention-based random access procedure have previously generally consisted of four steps; a preamble transmission, reception of a random access response (RAR) message, a layer 2/3 message transmission, and reception of a contention resolution message. Contention-free random access procedure which is used for the cases of downlink (DL) data arrival or during handover can reduce the latency in random access, as the UE performs two steps, transmission of an assigned preamble and reception of a RAR message, instead of 4 steps.

In the fifth generation (5G) radio access technology (RAT) or a new RAT (NR), contention-based 2-step RACH procedure can be considered to reduce RACH related signaling overhead and latency. This can be the case for small data transmission and/or for operation in unlicensed band. In the present disclosure, a physical layer design to support contention-based 2-step RACH procedure is presented.

For contention-based 2-Step RACH procedure, two approaches have been considered:
  (1) instances where a message is embedded in a random access preamble; and
  (2) instances where a message and a preamble are separately transmitted.

For contention-based 2-step RACH procedure, Message 1 (Msg1) may include at least a UE identity (ID) and some radio resource control (RRC) messages along with preamble, where a payload size may be up to, for example, 100 to 150 bits. However, the first approach, involving embedding the message in the RACH preamble, may not be suitable to accommodate a corresponding Msg1 size in the range of 100 to 150 bits.

In instances where a message and preamble were separately transmitted, detailed design aspects on a physical channel carrying Msg 1, for example how to indicate modulation and coding scheme (MCS) and a channel structure, have generally not been previously disclosed.

Figure 3:
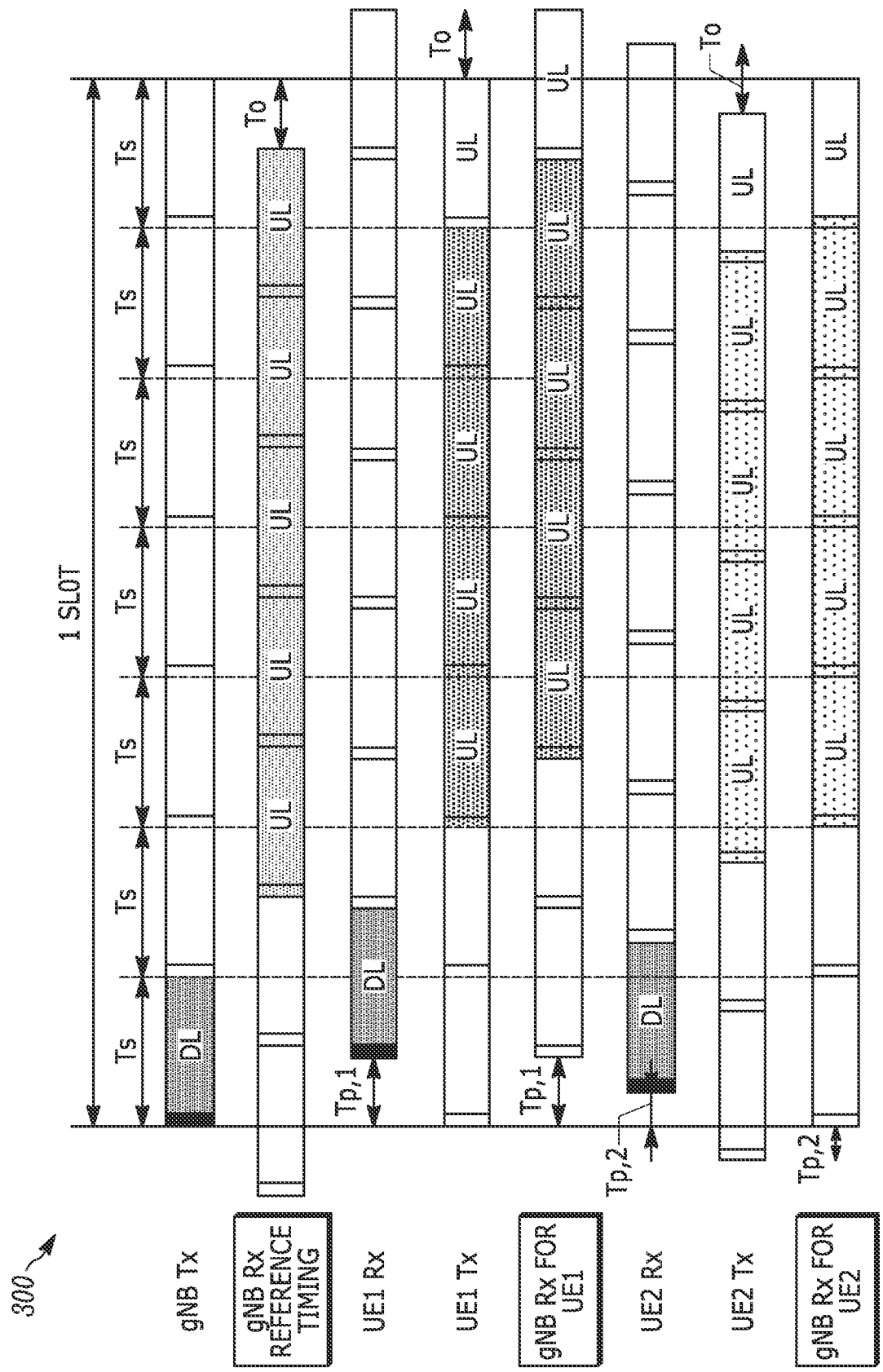
FIG. 3 is an example timing relationship for asynchronous multi-user uplink transmissions.
Figure 4:
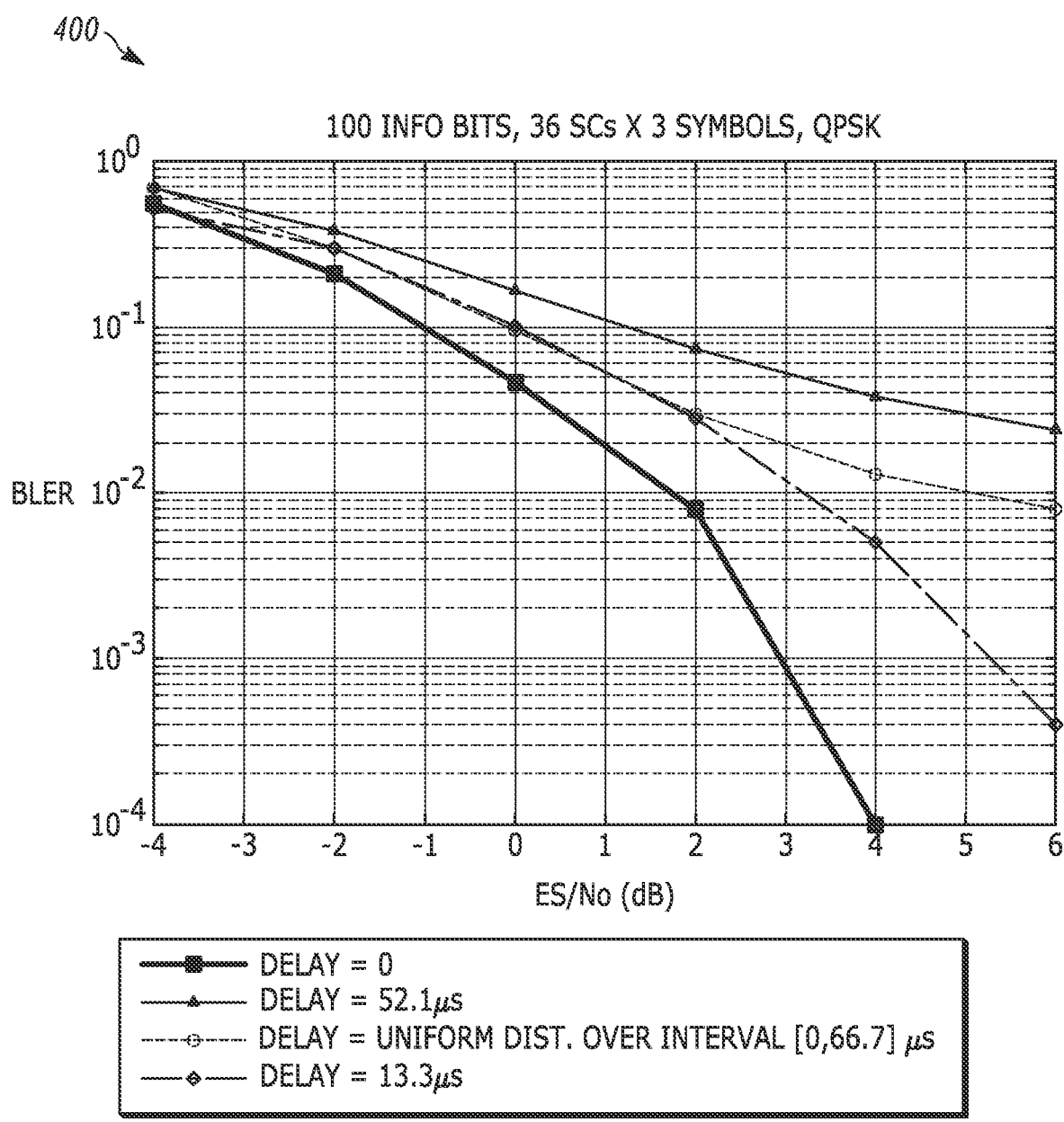
FIG. 4 is a graph of block error rate performance of a physical random access channel carrying data for various receive timing offset.

According to a possible embodiment, contention-based 2-step RACH procedure may be more suitable for small cells, for example up to 2 km cell radius, as a larger cell size might increase a potential timing offset at a receiver which is dependent on a propagation delay. FIG. 3 illustrates an example timing relationship for asynchronous multi-user uplink transmissions. More specifically, FIG. 3 shows that a UE with a larger propagation delay, for example UE1, may have a timing offset close to the data symbol duration 'Ts'. 'Tp1' corresponds to a propagation delay for user equipment 1, relative to a base station gNB. 'Tp2' corresponds to a propagation delay for user equipment 2, relative to base station gNB. 'To' corresponds to the base station gNB processing and switching time. A timing offset that is much larger than a cyclical prefix (CP) length in orthogonal frequency division multiplexing (OFDM) and/or involving discrete Fourier transform-spread-OFDM (DFT-S-OFDM) symbols may significantly degrade demodulation performance of physical random access channel carrying data (PRACH-D), as shown in FIG. 4. FIG. 4 illustrates a graph of block error ratio (BLER) performance of PRACH-D for various receive timing offsets, assuming perfect detection of preamble and timing offset, and more specifically a graph of block error ratio as a function of signal to noise ratio measured in decibels for 100 info bits included in 3 symbols across 36 subcarriers, where the info bits are encoded using quadrature phase shift keying. Thus, a network entity (NE) may be able to determine and correspondingly indicate whether a given cell is configured to support contention-based 2-step RACH or not via system information or a dedicated higher-layer message, such as a radio resource control message. Hereafter, 2-step RACH procedure refers to contention-based 2-step RACH procedure.

UE's Selection of RACH Procedure and SR Resource Configuration

A network entity (NE) may configure common time/frequency radio resources for physical random access channel carrying preamble (PRACH-P) but mutually exclusive two subsets of preambles for 2-step RACH and 4-step RACH procedures, respectively, for a given cell. A user equipment (UE) may select one of the RACH procedures, such as a 2-step RACH procedure or a 4-step RACH procedure, based on path loss estimates or reference signal received power (RSRP) measurements, and may transmit a PRACH preamble randomly selected from a corresponding subset for the selected RACH procedure. For example, among 64 preambles configured for a cell, 16 preambles may be assigned for use with the 2-step RACH procedure, and 48 preambles may be assigned for use with the 4-step RACH procedure. The UE may select the 2-step RACH procedure, if a reference signal received power (RSRP) value is larger than a configured RSRP threshold value.

Further, the network entity (NE) may semi-statically change the number of preambles assigned for use with the 2-step RACH procedure and 4-step RACH procedure, based on RSRP measurement reports received from UEs in the radio resource control (RRC) connected state and/or the RRC inactive state. For example, if the NE observes an increase of RRC connected UEs which have RSRP values higher than the threshold value, it may assign a larger number of preambles for 2-step RACH procedure. Furthermore, the NE may configure UEs whose RSRP values are lower than the threshold value with scheduling request (SR) resources so that they can avoid a longer 4-step RACH procedure for SR resources and can perform low-latency uplink transmission. For UEs with higher RSRP values which can potentially perform a 2-step RACH procedure, the NE might elect not to configure dedicated SR resources to reduce the system overhead.

DM RS in Message 1 Data Transmission of 2-Step RACH Procedure

The network entity (NE) may configure a set of time-frequency radio resources for PRACH-D in a cell, each of which is associated with a given PRACH preamble sequence. If the NE employs an advanced receiver such as parallel or successive interference cancellation, two or more PRACH preambles can be associated with one PRACH-D time-frequency radio resource. A user equipment (UE) performing 2-step RACH procedure transmits a PRACH preamble and PRACH-D in a resource associated with the transmitted preamble.

Once the NE detects a particular preamble and acquires timing and frequency information of the UE transmitting the detected preamble, it can perform demodulation and decoding of a corresponding PRACH-D. The received PRACH-D may have timing offset up to the maximum round-trip propagation delay, with respect to the reference receive timing for physical uplink shared channel (PUSCH). Note that PUSCH is transmitted with a proper timing advance (TA) value and is received with timing alignment to the reference receive timing. If a CP length of PRACH-D is set to be the same as the CP length of PUSCH for a given subcarrier spacing, the NE receiver may compensate frequency offset and apply fast Fourier transform (FFT) based on the acquired frequency and timing information. The receiver may have to perform multiple FFT operations with different receive timing for multiple detected preambles, while the CP overhead does not increase. If the number of subcarrier allocated to each PRACH-D resource is small, for example 12 subcarriers, FFT complexity can be reduced, such as from FFT size of 1024 to FFT size of 16, by time-domain frequency shifts, down-sampling, and anti-aliasing filtering. Alternatively, the CP length and subcarrier spacing of PRACH-D may be the same as those for PRACH-P, potentially with much longer CP length than the CP length of PUSCH.

Figure 5A:
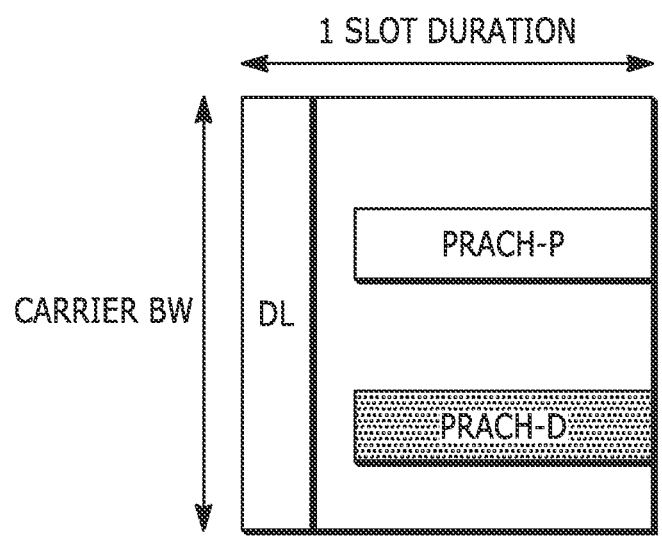
FIGS. 5A and 5B are exemplary physical channel structures for a 2-step random access channel including in FIG. 5A an example resource allocation of a physical random access channel carrying preamble and a physical random access channel carrying data; and in FIG. 5B an example symbol structure of a physical random access channel carrying data.
Figure 5B:
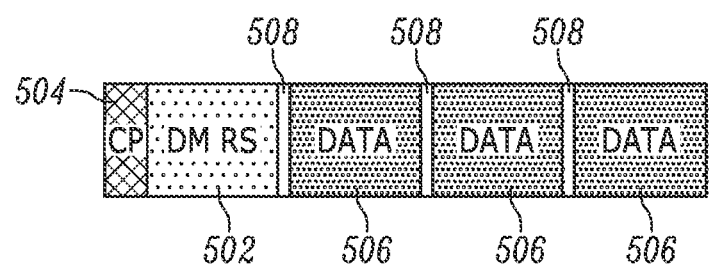

In one embodiment, PRACH-D carries demodulation reference signal (DM RS), and DM RS of PRACH-D is transmitted with a longer CP length (longer than a CP length of PRACH-D data symbols) and guard time (GT) appended to the DM RS symbol. The CP-length of DM RS of PRACH-D is determined based on the maximum round-trip delay and the maximum delay spread for UEs selecting 2-step RACH procedure in a cell. The guard time (GT) of DM RS of PRACH-D is also determined based on the maximum round-trip delay for the UEs performing 2-step RACH process in the cell. PRACH-D data symbols may employ the same CP length as PUSCH and not include GT. If the cell is large, for example 5 km cell radius, and if UEs within 2 km radius are expected to perform 2-step RACH procedure based on RSRP (or path loss) threshold setting, the CP-length of DM RS of PRACH-D is longer than the CP length of PRACH-D data symbols but less than the CP length of PRACH preamble. In another embodiment, DM RS of PRACH-D has a longer CP, but no GT is appended. FIGS. 5A and 5B show exemplary physical channel structures for 2-step RACH procedure, which includes in FIG. 5A an example resource allocation of PRACH-P and PRACH-D, as well as in FIG. 5B an example symbol structure of PRACH-D.

The example symbol structure of PRACH-D includes a demodulation reference signal (DM RS) 502 preceded by a cyclic prefix (CP) 504, and followed by multiple sets of data symbols 506, each of which are preceded by a cyclic prefix 508. In the illustrated embodiment, the cyclic prefix 508 which precedes each of the sets of data symbols 506 is shorter than the cyclic prefix 504 which precedes the demodulation reference signal 502.

The longer CP length would help promote synchronous reception of DM RS, which leads to DM RS reception without severe inter-carrier interference caused by timing offset larger than the CP length. When an operating signal-to-interference and noise ratio (SINR) range is low because of a small payload, channel estimation performance can be important to the overall demodulation performance. Thus, low inter-carrier interference (ICI) or ICI-free reception of DM RS is beneficial to achieve good demodulation performance of PRACH-D. Moreover, the longer CP of DM RS can maintain orthogonality of multiple orthogonal DM RS, such as a Zadoff-Chu (ZC) sequence and its cyclic shifts, when two or more PRACH preambles are associated with the same time-frequency resource for PRACH-D and multiple orthogonal DM RS for multiple PRACH-D are multiplexed in the same time-frequency resource. In one embodiment, a DM RS sequence for PRACH-D is determined by a preamble index or according to the order of preamble indices for the preambles associated with the same time-frequency resource for PRACH-D.

In another embodiment, the user equipment (UE) can indicate a modulation order and a payload size for PRACH-D by selecting a proper DM RS sequence for PRACH-D. As PRACH-D carries data often of limited size, such as UE ID, buffer status report (BSR), and small size user data, modulation may be limited to one or two low order modulation schemes, such as binary phase shift keying (BPSK) or quadrature phase shift keying (QPSK), and only a few payload sizes may need to be supported. In one example, 6 selections for combination of modulation and payload sizes are supported in PRACH-D, and 6 different DM RS sequences are used to indicate a selected modulation and payload size. Further, PRACH-D is allocated with 12 subcarriers per symbol, two PRACH preambles, such as preamble 1 and 2, are associated with a given PRACH-D resource, and DM RS occupies all the subcarriers within a DM RS symbol. If 12 cyclic shifts of a root Zadoff-Chu (ZC) sequence are available for DM RS, the first 6 cyclic shifts of the root ZC sequence are used for DM RS of PRACH-D associated with preamble 1, and the second 6 cyclic shifts are used for DM RS-D associated with preamble 2.

In another embodiment, channel bits (coded and rate-matched bits) of PRACH-D are scrambled by a scrambling sequence, which can be based on cell/TRP (transmit and receive point) ID and a preamble sequence index. Preamble-sequence specific scrambling would be beneficial to combat co-channel interference when two or more preambles are associated with a given PRACH-D time/frequency resource.

Random Access Response (RAR) Message

In one embodiment, if UE is in an RRC connected state or in an RRC inactive state, for example UE has a valid UE ID assigned by a cell, such as a cell-radio network temporary identifier (C-RNTI), the UE can receive a RAR message as downlink control information (DCI) in a UE-specific search space. If a network entity (NE) detects a preamble and decodes corresponding data successfully, the random access response (RAR) message can be UE-specific. That is, the RAR message can be transmitted in a UE-specific channel and can be addressed by a C-RNTI (i.e. cyclic redundancy check (CRC) bits appended are scrambled by the C-RNTI), wherein the NE can obtain the C-RNTI from decoding PRACH-D. Connected mode UEs perform a contention-based RACH procedure, when there is no SR resource configured for the UEs or uplink (UL) timing information is not up-to-date. Thus, the RAR message carrying UL transmit timing advance (TA) information and UL scheduling grant for subsequent UL data transmission may be transmitted in UE-specific physical downlink control channel (PDCCH) according to a special UL downlink control information (DCI) format. The special UL DCI format includes a bit field for timing advance (TA) information in addition to typical UL scheduling grant related information.

If the NE detects a preamble but fails to decode the corresponding data successfully, the NE transmits the RAR message in common physical downlink shared channel (PDSCH), and DCI carrying scheduling information of the RAR transmission is addressed by a random access-radio network temporary identifier (RA-RNTI), for example CRC bits appended to the DCI are scrambled by the RA-RNTI. The RA-RNTI may be determined by a time and frequency resource for PRACH-P.

An RRC connected or RRC inactive UE performs blind decoding of PDCCH both in a UE-specific search space and in a common search space. During the RACH response window, the UE additionally performs blind decoding of the special UL DCI format to receive the RAR message.

Figure 6:
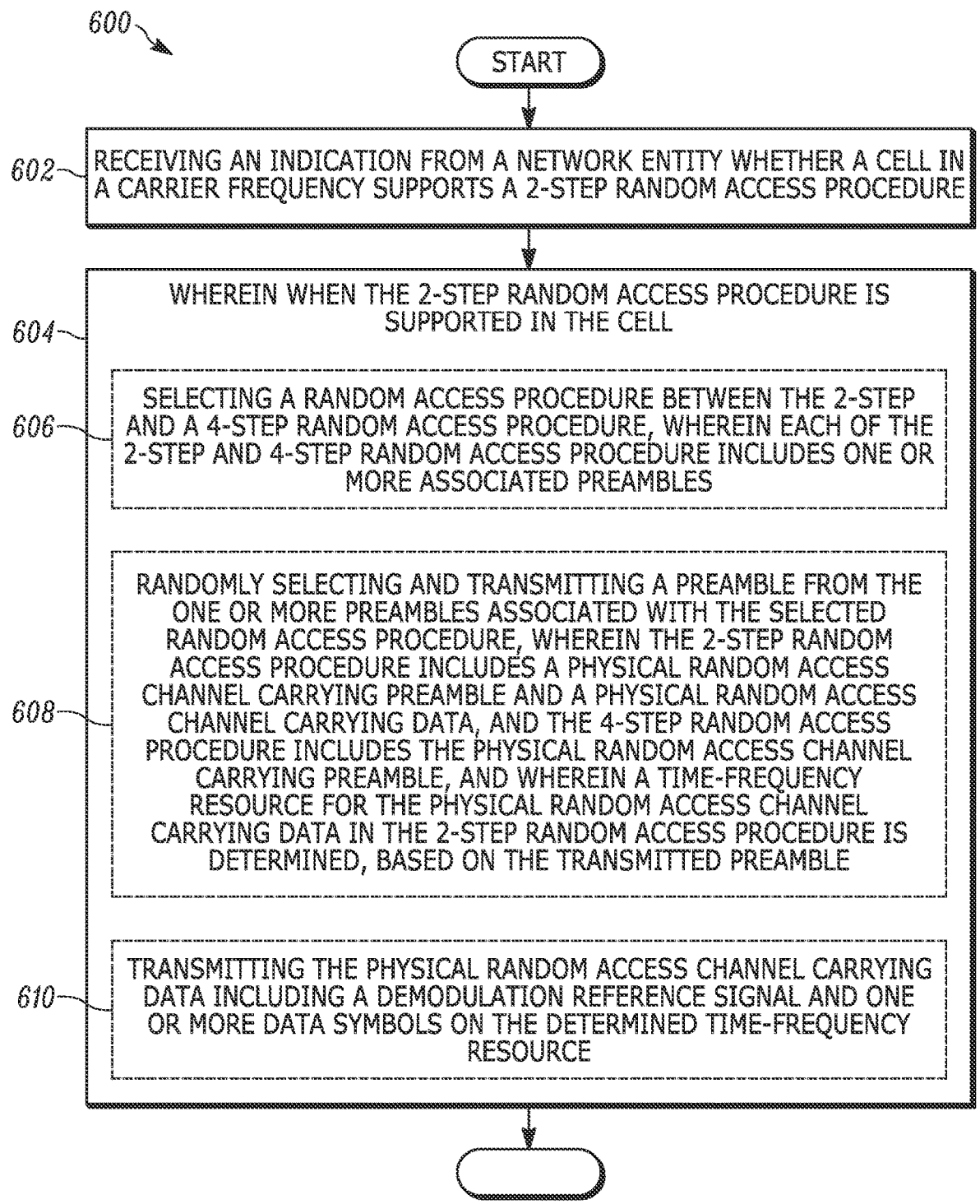
FIG. 6 is a flow diagram for performing in a user equipment contention based random access in a carrier frequency according to a possible embodiment.

FIG. 6 illustrates an exemplary flow diagram 600 for performing in a user equipment contention based random access in a carrier frequency according to a possible embodiment. The flow diagram illustrates the operation of a wireless communication device, such as the user equipment 110, according to at least one possible embodiment. At 602, an indication from a network entity is received identifying whether a cell in a carrier frequency supports a 2-step random access procedure. When the 2-step random access procedure is supported in the cell 604, the user equipment selects 606 a random access procedure between the 2-step and the 4-step random access procedures. Each of the 2-step random access procedure and the 4-step random access procedure includes one or more associated preambles. A preamble is then randomly selected from the one or more preambles associated with the selected random access procedure and transmitted 608. The 2-step random access procedure includes a physical random access channel carrying preamble and a physical random access channel carrying data. The 4-step random access procedure includes the physical random access channel carrying preamble. A time-frequency resource for the physical random access channel carrying data in the 2-step random access procedure is determined, based on the transmitted preamble. The physical random access channel carrying data including a demodulation reference signal and one or more data symbols is transmitted on the determined time-frequency resource 610.

In at least some embodiments, the flow diagram 600 could be extended to include a selection by the user equipment of one of the 2-step random access procedure or the 4-step random access procedure. In some instances, the selection with be based on a path loss estimate, where the 2-step random access procedure is selected if the path loss estimate is less than a predetermined path loss estimate threshold, and the 4-step random access procedure is selected if the path loss estimate is greater than the predetermined path loss estimate threshold. In other instances, the selection can be based upon a reference signal received power measurement, where the 2-step random access procedure is selected if the reference signal received power measurement is greater than a predetermined reference signal received power measurement threshold, and the 4-step random access procedure is selected if the reference signal received power measurement is less than the predetermined reference signal received power measurement threshold.

In some instances, when the user equipment selects the 4-step random access procedure, the user equipment could be configured by the network entity with scheduling request resources.

The same or other instances might allow where when the one or more preambles are associated with each one of the 2-step random access procedure or the 4-step random access procedures, the preambles used in the cell could be configured into two mutually exclusive subsets of preambles, which are separately associated with the respective ones of the 2-step random access procedure and the 4-step random access procedure. The number of preambles in each of the two mutually exclusive subsets of preambles, is some instances, could be semi-statically changed by the network entity, based on one or more reference signal received power measurement reports received from one or more user equipments in the cell. Still further, the number of preambles in each of the two mutually exclusive subsets of preambles could be based upon a ratio of a number of reference signal received power measurements included in the reference signal received power measurements reports received from the one or more user equipments in the cell, which are greater than a predetermined reference signal received power measurement threshold relative to a number of the reference signal received power measurements included in the reference signal received power measurements reports received from the one or more user equipments in the cell, which are less than the predetermined reference signal received power measurement threshold.

In some instances, the demodulation reference signal sequence can be determined based on at least one of a modulation order of the physical random access channel carrying data, a payload size of the physical random access channel carrying data, or a preamble sequence index of the transmitted preamble.

In some instances, the demodulation reference signal symbol of the physical random access channel carrying data could have a longer cyclic prefix than the one or more data symbols of the physical random access channel carrying data. In some of these instances, the cyclic prefix length of the demodulation reference signal symbol of the physical random access channel carrying data could be determined based on the maximum round-trip delay for the user equipment performing the 2-step random access procedure in the cell. The demodulation reference signal symbol of the physical random access channel carrying data could also have a guard time that is based on the maximum round-trip delay for the user equipment performing the 2-step random access procedure in the cell. The cyclic prefix length of the demodulation reference signal symbol of the physical random access channel carrying data could also and/or alternatively be determined based on the maximum delay spread for all user equipment within the cell, which are selecting a 2-step random access procedure.

In some instances, channel bits of the physical random access channel carrying data could be scrambled by a scrambling sequence. In some of these instances, the scrambling sequence could be based upon a network entity identity and a preamble sequence index.

In some instances, when the user equipment has a valid user equipment identity assigned by a cell, the user equipment could includes the valid user equipment identity in the physical random access channel carrying data and could receives a random access response message as downlink control information in a user equipment specific search space. In some of these instances, the valid user equipment identity could be a cell-radio network temporary identifier, and the user equipment specific search space within which the random access response message is transmitted could include user equipment specific physical downlink control channels, where appended cyclic redundancy check bits could be scrambled by the cell-radio network temporary identifier. It may also be possible, that downlink control information for the random access response message could contain a field for an uplink timing advance value. It is still further possible, that a physical downlink control channel could be monitored both for the user equipment specific search space and for a common search space for reception of the random access response message, where monitoring the physical downlink control channel could include attempting to decode the physical downlink control channel assuming a first payload size for the user equipment specific search space and assuming a second payload size for the common search space, where appended cyclic redundancy check bits in the physical downlink control channel of the common search space are scrambled by a random access-radio network temporary identifier.

Figure 7:
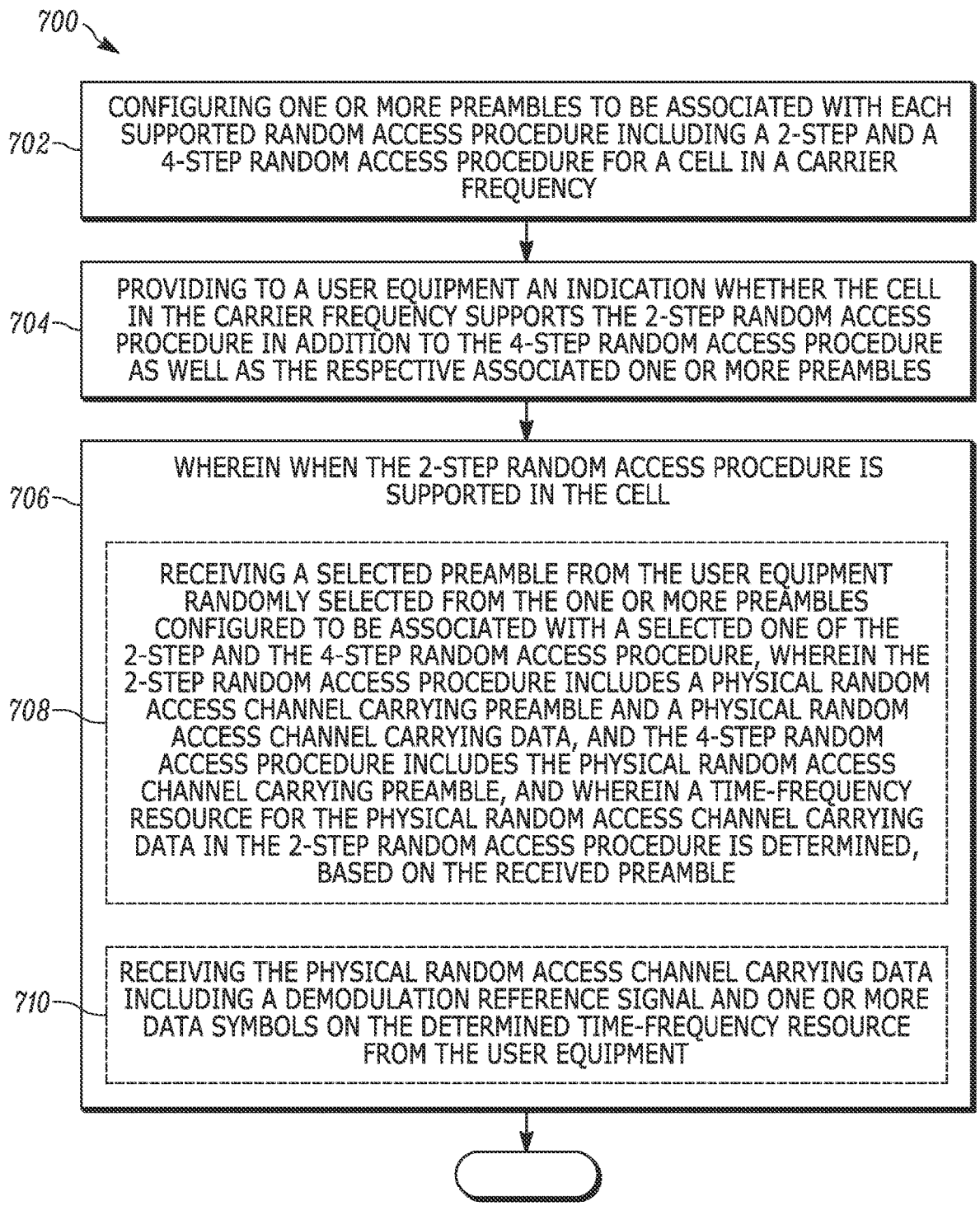
FIG. 7 is a flow diagram for performing in a network entity contention based random access in a carrier frequency according to a possible embodiment.

FIG. 7 illustrates an exemplary flow diagram 700 for performing in a network entity contention based random access in a carrier frequency according to a possible embodiment. The flow diagram illustrates the operation in a network entity, which could include a base station 120 and/or other elements from a network 130, according to at least one possible embodiment. At 702, one or more preambles are configured to be associated with each supported random access procedure including a 2-step random access procedure and a 4-step random access procedure for a cell in a carrier frequency. An indication as to whether the cell in the carrier frequency supports the 2-step random access procedure in addition to the 4-step random access procedure, as well as the respective associated one or more preambles, is provided 704 to a user equipment. When the 2-step random access procedure is supported in the cell, a selected preamble is received 708 from the user equipment, which is randomly selected from the one or more preambles that are configured to be associated with a selected one of the 2-step random access procedure and the 4-step random access procedure. The 2-step random access procedure includes a physical random access channel carrying preamble and a physical random access channel carrying data. The 4-step random access procedure includes the physical random access channel carrying preamble. A time-frequency resource for the physical random access channel carrying data in the 2-step random access procedure is determined, based on the received preamble. The physical random access channel carrying data including a demodulation reference signal and one or more data symbols is then received on the determined time-frequency resource 710.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
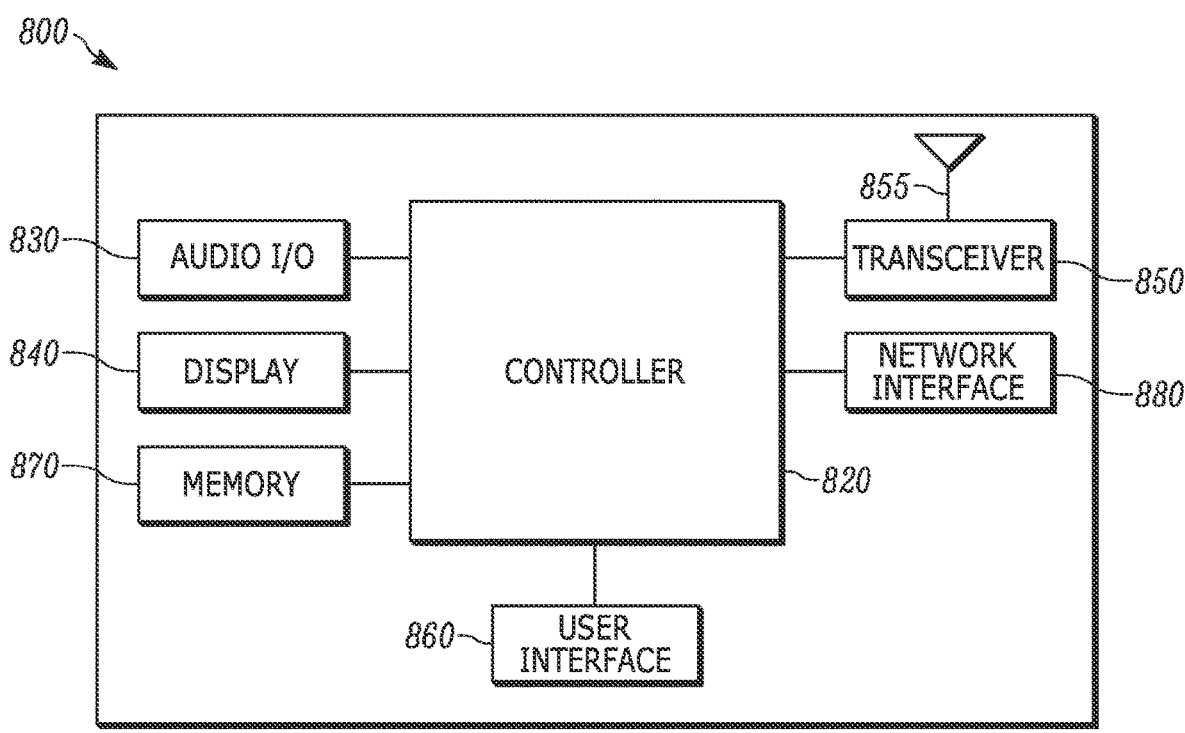
FIG. 8 is an example block diagram of an apparatus according to a possible embodiment.

FIG. 8 is an example block diagram of an apparatus 800, such as the wireless communication device 110, according to a possible embodiment. The apparatus 800 can include a housing 810, a controller 820 within the housing 810, audio input and output circuitry 830 coupled to the controller 820, a display 840 coupled to the controller 820, a transceiver 850 coupled to the controller 820, an antenna 855 coupled to the transceiver 850, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The transceiver 850 can include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a solid state memory, a flash memory, a removable memory, a hard drive, a cache, or any other memory that can be coupled to an apparatus.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments. Some or all of the additional elements of the apparatus 800 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first", "second", and the like may be used solely to distinguish one entity or action from another entity or action without necessarily requiring or implying any actual such relationship or order between such entities or actions. The phrase "at least one of", "at least one selected from the group of", or "at least one selected from" followed by a list is defined to mean one, some, or all, but not necessarily all of, the elements in the list. The terms "comprises", "comprising", "including", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that comprises the element. Also, the term "another" is defined as at least a second or more. The terms "including", "having", and the like, as used herein, are defined as "comprising". Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:
    receiving an indication that a cell in a carrier frequency supports a 2-step random access procedure;
    transmitting a random access channel (RACH) preamble of the 2-step random access procedure to initiate the 2-step random access procedure;
    transmitting, based at least in part on a resource associated with the RACH preamble, data comprising a cell-radio network temporary identifier (C-RNTI) associated with the UE; and
    receiving, in response to the RACH preamble and the data, a downlink control information (DCI) addressed by the C-RNTI associated with the UE, wherein the DCI is received within a random access response (RAR) window, wherein the DCI is associated with a RAR message of the 2-step random access procedure.

2. The method of claim 1, wherein the DCI is associated with a UE specific physical downlink control channel (PDCCH), and wherein the UE specific PDCCH comprises cyclic redundancy check (CRC) bits scrambled by the C-RNTI.

3. The method of claim 1, wherein the RACH preamble is transmitted on a first time-frequency resource, wherein the data is transmitted on a second time-frequency resource, and wherein the method further comprises determining the second time-frequency resource based at least in part on the RACH preamble.

4. The method of claim 1, further comprising transmitting a demodulation reference signal (DMRS) associated with the data, wherein a DMRS sequence of the DMRS is determined based at least in part on the RACH preamble.

5. The method of claim 1, wherein one or more bits corresponding to the data are scrambled by a scrambling sequence, wherein the scrambling sequence is based at least in part on a preamble index of the RACH preamble, and wherein the preamble index is based at least in part on an order of the RACH preamble in a plurality of RACH preambles associated with a time-frequency resource, and wherein the RACH preamble is transmitted on the time-frequency resource.

6. The method of claim 1, wherein a demodulation reference signal (DMRS) symbol associated with the data corresponds to an earliest symbol in a time-frequency resource associated with the RACH preamble, and wherein the earliest symbol in the time-frequency resource has a longer cyclic prefix than one or more data symbols of the data.

7. The method of claim 1, further comprising:
receiving an indication that the cell in the carrier frequency supports a 4-step random access procedure; and
selecting between the 2-step random access procedure and the 4-step random access procedure, wherein the RACH preamble and the data are transmitted based at least in part on the 2-step random access procedure being selected.

8. The method of claim 7, further comprising receiving information of a reference signal received power (RSRP) threshold value, wherein selecting between the 2-step random access procedure and the 4-step random access procedure is based at least in part on an RSRP measurement, wherein the 2-step random access procedure is selected if the RSRP measurement is greater than the RSRP threshold value, and wherein the 4-step random access procedure is selected if the RSRP measurement is equal to or less than the RSRP threshold value.

9. The method of claim 1, wherein the RACH preamble is randomly selected from at least one preamble associated with the 2-step random access procedure.

10. The method of claim 1, wherein the DCI comprises information associated with an uplink timing advance value.

11. The method of claim 1, wherein the DCI comprises information associated with an uplink grant.

12. A user equipment (UE) for wireless communication, comprising:
at least one memory; and
at least one processor coupled with the at least one memory and operable to cause the UE to:
receive an indication that a cell in a carrier frequency supports a 2-step random access procedure;
transmit a random access channel (RACH) preamble of the 2-step random access procedure to initiate the 2-step random access procedure;
transmit, based at least in part on a resource associated with the RACH preamble, data comprising a cell-radio network temporary identifier (C-RNTI) associated with the UE; and
receive, in response to the RACH preamble and the data, a downlink control information (DCI) addressed by the C-RNTI associated with the UE, wherein the DCI is received within a random access response (RAR) window, wherein the DCI is associated with a RAR message of the 2-step random access procedure.

13. The UE of claim 12, wherein the RACH preamble is transmitted on a first time-frequency resource, wherein the data is transmitted on a second time-frequency resource, and wherein the at least one processor is further configured to cause the UE to determine the second time-frequency resource based at least in part on the RACH preamble.

14. The UE of claim 12, wherein one or more bits corresponding to the data are scrambled by a scrambling sequence, wherein the scrambling sequence is based at least in part on a preamble index of the RACH preamble, wherein the preamble index is based at least in part on an order of the RACH preamble in a plurality of RACH preambles associated with a time-frequency resource, wherein the RACH preamble is transmitted on the time-frequency resource, and wherein the scrambling sequence is further based at least in part on a cell identity and the preamble index of the RACH preamble.

15. The UE of claim 12, wherein the at least one processor is further operable to cause the UE to:
receive an indication that the cell in the carrier frequency supports a 4-step random access procedure; and
select between the 2-step random access procedure and the 4-step random access procedure, wherein the RACH preamble and the data are transmitted based at least in part on the 2-step random access procedure being selected.

16. The UE of claim 15, wherein the at least one processor is further operable to cause the UE to receive information of a reference signal received power (RSRP) threshold value, wherein selecting between the 2-step random access procedure and the 4-step random access procedure is based at least in part on an RSRP measurement, wherein the 2-step random access procedure is selected if the RSRP measurement is greater than the RSRP threshold value, and wherein the 4-step random access procedure is selected if the RSRP measurement is equal to or less than the RSRP threshold value.

17. The UE of claim 15, wherein the RACH preamble is transmitted on a time-frequency resource, and wherein a plurality of RACH preambles associated with the time-frequency resource comprises two mutually exclusive subsets of RACH preambles that are separately associated with one of the 2-step random access procedure or the 4-step random access procedure.

18. A base station for wireless communication, comprising:
at least one memory; and
at least one processor coupled with the at least one memory and operable to cause the base station to:
transmit an indication that the base station supports a 2-step random access procedure, wherein the base station is associated with a carrier frequency;
receive a random access channel (RACH) preamble of the 2-step random access procedure, wherein the RACH preamble initiates the 2-step random access procedure;
receive, based at least in part on a resource associated with the RACH preamble, data comprising a cell-radio network temporary identifier (C-RNTI) associated with a user equipment (UE); and
transmit, in response to the RACH preamble and the data, a downlink control information (DCI) addressed by the C-RNTI associated with the UE, wherein the DCI is transmitted within a random access response (RAR) window, wherein the DCI is associated with a RAR message of the 2-step random access procedure.

19. The base station of claim 18, wherein the at least one processor is further operable to cause the base station to:
determine, based at least in part on the RACH preamble, the C-RNTI; and
scramble one or more cyclic redundancy check (CRC) bits appended to the RAR message using the C-RNTI.

20. A method performed by a base station, the method comprising:

transmitting an indication that the base station supports a 2-step random access procedure, wherein the base station is associated with a carrier frequency;

receiving a random access channel (RACH) preamble of the 2-step random access procedure, wherein the RACH preamble initiates the 2-step random access procedure;

receiving, based at least in part on a resource associated with the RACH preamble, data comprising a cell-radio network temporary identifier (C-RNTI) associated with a user equipment (UE); and transmitting, in response to the RACH preamble and the data, a downlink control information (DCI) addressed by the C-RNTI associated with the UE, wherein the DCI is transmitted within a random access response (RAR) window, wherein the DCI is associated with a RAR message of the 2-step random access procedure.

* * * * *